US012673631B2

(12) United States Patent
Kumar et al.

(10) Patent No.: US 12,673,631 B2
(45) Date of Patent: Jul. 7, 2026

(54) AIRBAG DEVICE PROVIDED TO STEERING WHEEL

(71) Applicant: Autoliv Development AB, Vargarda (SE)

(72) Inventors: Sumit Kumar, Kanagawa (JP);
Kazuhiro Abe, Kanagawa (JP);
Ryotaro Ishida, Kanagawa (JP);
Keisuke Honma, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/992,006

(22) PCT Filed: Jul. 3, 2023

(86) PCT No.: PCT/JP2023/024622
§ 371 (c)(1),
(2) Date: Jan. 7, 2025

(87) PCT Pub. No.: WO2024/009952
PCT Pub. Date: Jan. 11, 2024

(65) Prior Publication Data
US 2026/0014952 A1     Jan. 15, 2026

(30) Foreign Application Priority Data

Jul. 7, 2022     (JP) ................................. 2022-109561

(51) Int. Cl.
B60R 21/203     (2006.01)
B60R 21/215     (2011.01)
(Continued)

(52) U.S. Cl.
CPC ........ B60R 21/2037 (2013.01); B60R 21/215 (2013.01); B60R 21/217 (2013.01);
(Continued)

(58) Field of Classification Search
CPC .............. B60R 21/203; B60R 21/2032; B60R 21/2035; B60R 21/2037; B60R 21/215;
(Continued)

(56) References Cited

U.S. PATENT DOCUMENTS

2003/0201629 A1 * 10/2003 Matsuda ................. B60R 21/26
280/736
2010/0181747 A1 * 7/2010 Schorle ................. B60R 21/261
137/13
(Continued)

FOREIGN PATENT DOCUMENTS

EP          2995512 B1 * 11/2017 ............. B60R 21/26
JP     H04292238 A  * 10/1992
(Continued)

*Primary Examiner* — Keith J Frisby
(74) *Attorney, Agent, or Firm* — Foley & Lardner LLP

(57) ABSTRACT

To provide an airbag device provided in a steering wheel, which enables an airbag module to be made smaller so as to be compatible with a steering wheel having a smaller center pad than conventional ones. The airbag device includes an airbag module containing an airbag cushion and a cylindrical inflator that supplies inflator gas to the airbag cushion, a damper unit that dampens vibrations transmitted between the airbag module and the steering wheel, a mounting member formed of a plate material and to which the inflator and the damper unit are assembled, and an elastic member that is provided between the mounting member and the steering wheel and elastically holds the airbag module to the steering wheel. The mounting member is formed with a circular through-hole part for press-fitting the inflator to secure the inflator, and a retaining part for holding the damper unit.

13 Claims, 7 Drawing Sheets

(51) Int. Cl.
    B60R 21/217 (2011.01)
    B62D 7/22 (2006.01)

(52) U.S. Cl.
    CPC ...... B62D 7/222 (2013.01); *B60R 2021/2173*
        (2013.01); *B60R 2021/2175* (2013.01); *B60Y*
        *2400/48* (2013.01)

(58) Field of Classification Search
    CPC ............ B60R 21/217; B60R 21/21656; B60R
            21/21658; B60R 2021/2173; B60R
            2021/2175; B60R 2021/26076; B60R
            2021/26082; B60Y 2400/48; B60Y
            2304/01; B62D 7/222; B62D 7/22; B60Q
                                    5/003
    USPC .................................. 280/728.1, 728.2, 731

See application file for complete search history.

(56) References Cited

U.S. PATENT DOCUMENTS

| | | | | |
|---|---|---|---|---|
| 2014/0131982 A1* | 5/2014 | Ishii | ................... | B60R 21/2037 |
| | | | | 280/728.2 |
| 2016/0257278 A1* | 9/2016 | Fudamoto | ............. | B60R 21/217 |

FOREIGN PATENT DOCUMENTS

| | | | | | |
|---|---|---|---|---|---|
| JP | 2001151066 | A | * | 6/2001 | ........ B60R 21/2037 |
| JP | 2010-69934 | A | | 4/2010 | |
| JP | 2011-68268 | A | | 4/2011 | |
| JP | 2011105164 | A | * | 6/2011 | |
| JP | 6434699 | B2 | * | 12/2018 | |
| JP | 2020-26263 | A | | 2/2020 | |
| KR | 100616437 | B1 | * | 8/2006 | .......... B60R 21/203 |
| WO | WO-2015015867 | A1 | * | 2/2015 | .......... B60R 21/217 |
| WO | WO-2015060080 | A1 | * | 4/2015 | .......... B60R 21/235 |
| WO | 2020/162309 | A1 | | 8/2020 | |

* cited by examiner

AIRBAG DEVICE PROVIDED TO STEERING WHEEL

TECHNICAL FIELD

The present invention relates to an airbag device provided in a steering wheel, which enables an airbag module to be made smaller in size relative to the outer diameter of the steering wheel.

BACKGROUND ART

Conventionally, technology is known for attaching an airbag module equipped with an inflator to a steering wheel, as disclosed in Patent Document 1.

In the "steering wheel with airbag device" of the patent document 1, the horn switch mechanism is provided with a securing pin that is secured to the core metal of the steering wheel main body as well as a support member that retractably supports the bag holder with respect to the core metal, and a movable equipped member as an insulating part that is interposed as electrical insulation between the securing pin and bag holder. In addition, the horn switch mechanism is provided with a compression coil spring as a biasing member that biases the bag holder away from the core metal, and a contact terminal as a movable side contact part that moves with the bag holder. Furthermore, the contact terminals make contact with the securing pins and conduct based on movement of the bag holder toward the core metal side against the bias force of the compression coil spring, activating the horn device of the vehicle.

RELATED ART DOCUMENTS

Patent Documents

Patent Document 1: Japanese Unexamined Patent Application 2010-69934

SUMMARY OF THE INVENTION

Problem to be Solved by the Invention

Regarding the mounting structure of the inflator, Patent Document 1 states: "[0018] As depicted in the drawings, the airbag device includes a bag holder, an airbag, an inflator, and a pad. [0024] The inflator includes a flange part on a cylindrical body, and four mounting pieces are further extended radially outward from the flange part at equal angular intervals. Each mounting piece has a screw hole corresponding to a screw hole in the bag holder. The inflator is then inserted into the opening of the bag holder, and the flange part is brought into contact with the periphery of the opening, and the inflator is attached together with a ring retainer, which will be described below. [0047] Each member (horn switch mechanism, ring retainer, airbag, and pad) is assembled from above onto the bag holder".

In a structure in which an inflator having a flange part with a mounting piece extending radially outward is attached to a mounting surface of a bag holder that is aligned with the steering surface of the steering wheel, and functional components such as a horn switch mechanism are attached around the outside of the inflator, a large mounting space must be secured to mount an inflator that is large enough to reach the position of the mounting piece, and the functional components must be positioned outside this mounting space.

This results in a problem that the size of the bag holder to which the inflator and functional components are assembled along the steering surface of the steering wheel became larger, and an airbag device provided in a steering wheel having a smaller center pad than conventional steering wheels could not be made smaller in size than the outer diameter dimension of the steering wheel center pad.

Generally, a driver's airbag has functions such as a horn function, a damper function, and a function for holding the airbag cushion when the airbag cushion is activated during a collision. There is also a need to facilitate the installation of a driver's airbag in the steering wheel. To achieve these objectives, some driver's seat airbags have a three-pin damper structure. This structure required the arrangement of a plurality of metal members, such as a housing, locking plate, inflator flange, and retainer, to hold components such as the inflator, airbag cushion, damper, and pads. In addition, in order to provide strength, the device was sometimes formed by drawing, but this was a barrier to miniaturization.

In consideration of the above-mentioned problems in the conventional technology, an object of the present invention is to provide an airbag device provided in a steering wheel which enables the airbag module to be made smaller so as to be compatible with steering wheels having smaller center pads than conventional.

Means for Solving the Problem

An airbag device provided in a steering wheel according to the present invention includes:

an airbag module containing an airbag cushion and a cylindrical shaped inflator that supplies inflator gas to the airbag cushion;

a functional component provided between the airbag module and the steering wheel; and a mounting member formed of a plate material to which the inflator and the functional component are assembled, wherein the mounting member has formed thereon:

a circular through-hole part into which the inflator is press-fit to secure the inflator; and a retaining part for retaining the functional component.

It is preferable that the circular through-hole part is formed through the mounting member in the axial direction of an axis perpendicular to the center of the bottom surface of the inflator, and is configured to include a circular hole into which the inflator is fitted, and an annular rib formed on the inner circumferential edge of the circular hole and pressed against the circumferential side surface of the inflator.

An annular stopper is preferably provided on the outer circumferential portion of the inflator between the annular rib and the gas discharge hole of the inflator.

The mounting member is preferably provided with a flat part on an outer circumference of the circular through-hole part and the retaining part is provided so as to form a step with this flat part.

The step is preferably a vertical wall extending from the flat part forming an inner groove part and the retaining part formed on the inner groove part.

The functional component is preferably a damper unit that dampens vibration transmitted between the airbag module and the steering wheel, is provided between the mounting member and the steering wheel, and includes an elastic member that elastically holds the airbag module on the steering wheel.

The airbag module is preferably provided with a securing member attached and secured to the mounting member so as to cover the airbag module, the first end of the functional component is held between the securing member and the mounting member, and the second end is held on the steering wheel.

The airbag module is preferably provided with a cover for covering the airbag cushion and this cover is attached to the securing member.

The mounting member preferably includes an annular reinforcing wall part surrounding the flat part and the retaining part.

The airbag module is preferably provided with a cover for covering the airbag cushion and this cover is attached to the reinforcing wall part.

Effect of the Invention

In the airbag device provided in a steering wheel according to the present invention, the airbag module can be made smaller so as to be compatible with steering wheels having smaller center pads than conventional ones.

BRIEF DESCRIPTION OF THE DRAWINGS

FIGS. 1(a) and 1(b) provide a perspective view depicting an outline of an airbag device provided in a steering wheel according to a preferred embodiment of the present invention in which FIG. 1(a) depicts the entire steering wheel and FIG. 1(b) depicts the disassembled state with an airbag module removed from the steering wheel;

FIGS. 3(a) and 3(b) illustrate a damper unit provided in the airbag device of FIG. 1 in which FIG. 3(a) is a perspective view of the damper unit and FIG. 3(b) is an exploded perspective view of the damper unit;

DESCRIPTION OF THE PREFERRED EMBODIMENTS

Hereinafter, preferred embodiments of an airbag device provided in a steering wheel according to the present invention will be described in detail with reference to the accompanying drawings.

Figure 1A:
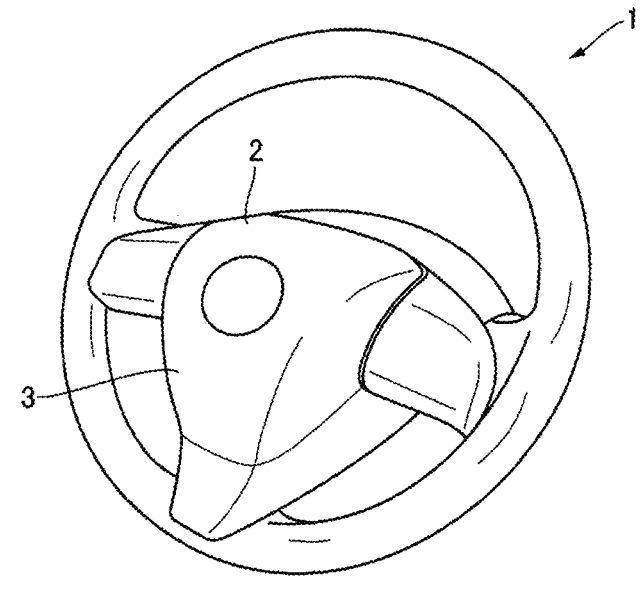
Figure 1B:
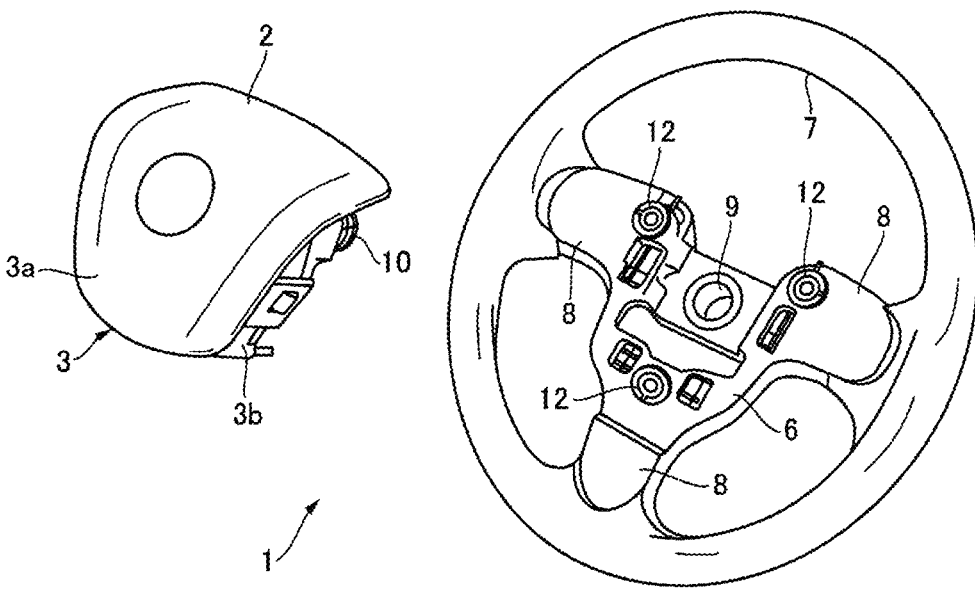

FIG. 1 is a perspective view depicting an outline of an airbag device provided in a steering wheel according to the present Embodiment, in which FIG. 1(a) depicts the entire steering wheel 1, and FIG. 1(b) depicts the disassembled state with an airbag module 2 removed from the steering wheel 1. In the present specification, the side facing the driver is referred to as the front side, and the opposite side is referred to as the back side.

The steering wheel 1 is installed at the driver's seat of the vehicle and is connected to a steering shaft that passes through the inside of a steering column, and transmits the steering operation of the steering wheel 1 by the driver to a steering gear or the like.

A steering wheel 1 contains a core metal member. The core metal member is composed of a center boss part 6, an annular rim part 7 gripped by the driver, and spoke parts 8 that connect the boss part 6 and rim part 7.

The boss part 6 has a shaft hole 9 formed that connects to the steering shaft. The boss part 6 is also provided with three mounting holes 13 around the shaft hole 9, in which hollow cylindrical collar members 12 are disposed (see FIG. 4).

The steering wheel 1 is steered by a rim part 7 that defines a steering surface, and the outer diameter of the rim part 7 is the outer diameter of the steering wheel 1.

An airbag module 2 with a built-in airbag cushion is attached on the steering wheel 1.

The side of the airbag module 2 facing the driver is covered with a horn cover 3. The horn cover 3 is composed of a cover surface part 3a which is a design surface, and a hollow cylindrical part 3b which is integrally formed on the rear side of the cover surface part 3a (see FIG. 2 and FIG. 4). An airbag cushion 5 is stowed inside the cylindrical part 3b.

When inflator gas is supplied to the airbag cushion 5 in the event of an emergency such as a collision, the airbag cushion 5 tears open the cover surface part 3a of the horn cover 3 and expands and deploys toward the vehicle interior space to restrain and protect the driver.

The airbag module 2 normally functions as a horn button that the driver presses toward the steering wheel 1 for sounding the horn.

The airbag module 2 further functions as a damper mass. For this reason, the airbag module 2 is provided with a damper unit 10 for damping the vibration of the steering wheel 1 (see FIG. 2 to FIG. 4).

Figure 2:
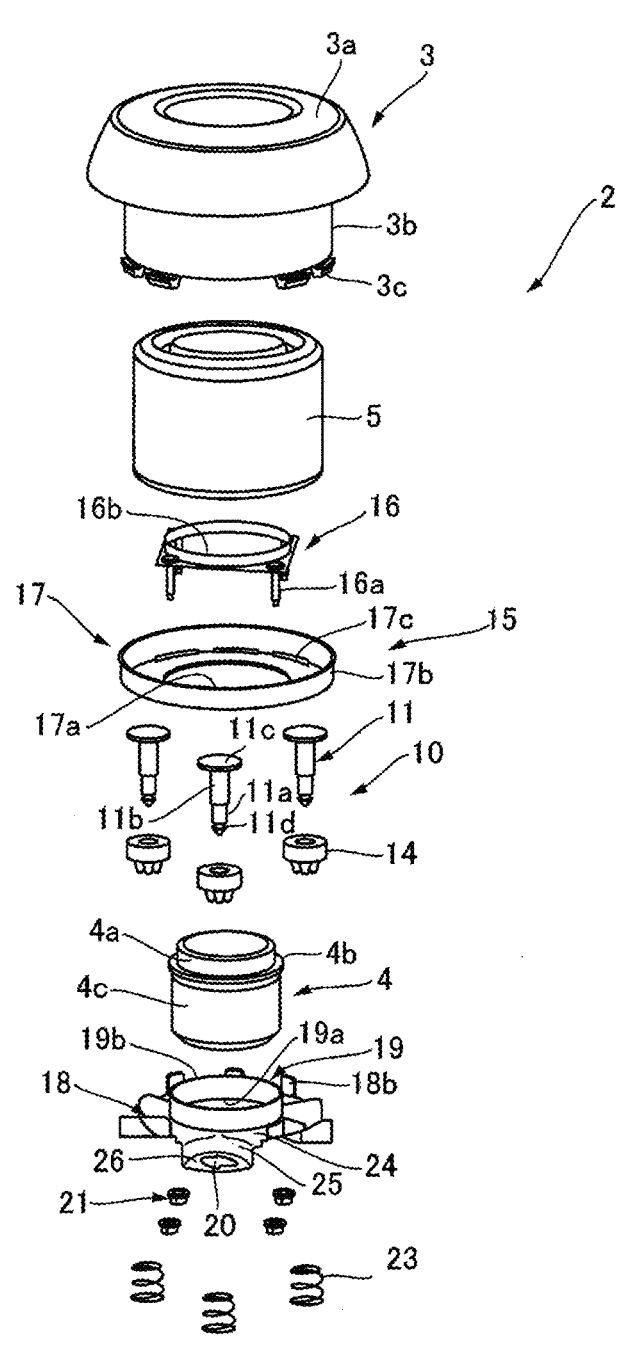
FIG. 2 is an exploded perspective view of an airbag module provided in the airbag device of FIG. 1.

FIG. 2 depicts an exploded perspective view of the airbag module 2. The airbag module 2 includes a horn cover 3, an airbag cushion 5, an inflator 4 that supplies inflator gas to the inside of the airbag cushion 5, and a module base 15 for attaching and securing the inflator 4 and the airbag cushion 5.

The module base 15 is composed of a retainer ring 16 for mounting the airbag cushion 5, a securing member 17 formed of a plate material and overlapped on the back side of the retainer ring 16, and a mounting member 18 formed of a plate material and further overlapped on the back side of the securing member 17. The securing member 17 and the mounting member 18 are formed with bolt through holes 18a through which the bolts 16a of the retainer ring 16 are inserted.

Figure 4:
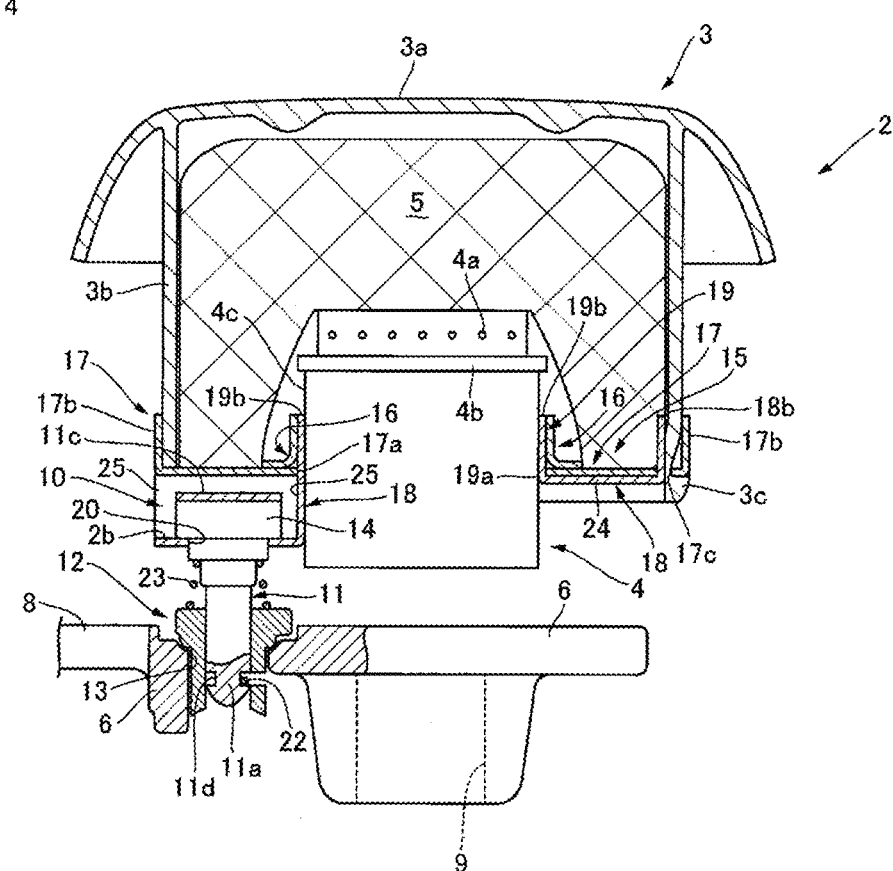
FIG. 4 is a cross-sectional view showing an assembled state of the airbag device provided in a steering wheel depicted in FIG. 1.
Figure 5:
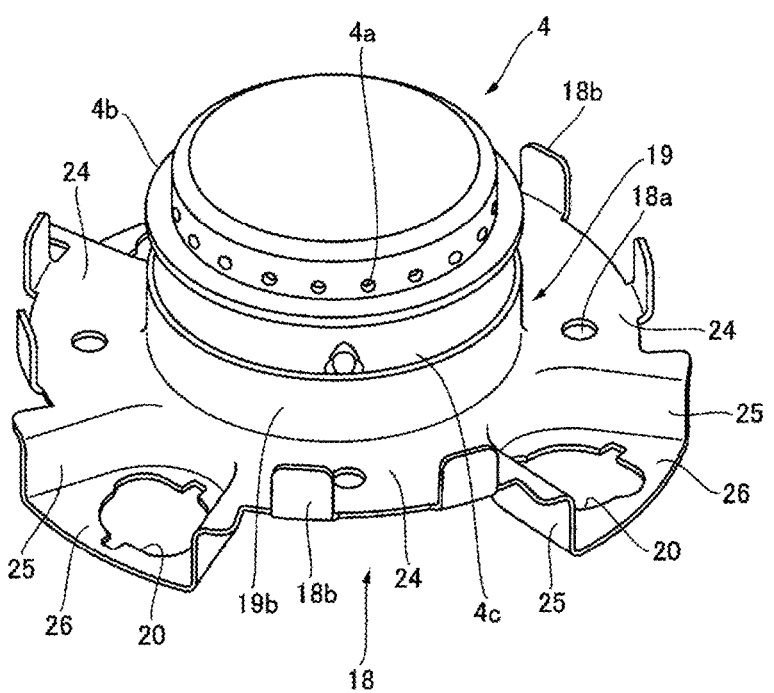
FIG. 5 is a perspective view of an inflator and mounting member provided in the airbag module of FIG. 2 in an assembled state.
Figures 6, 7:
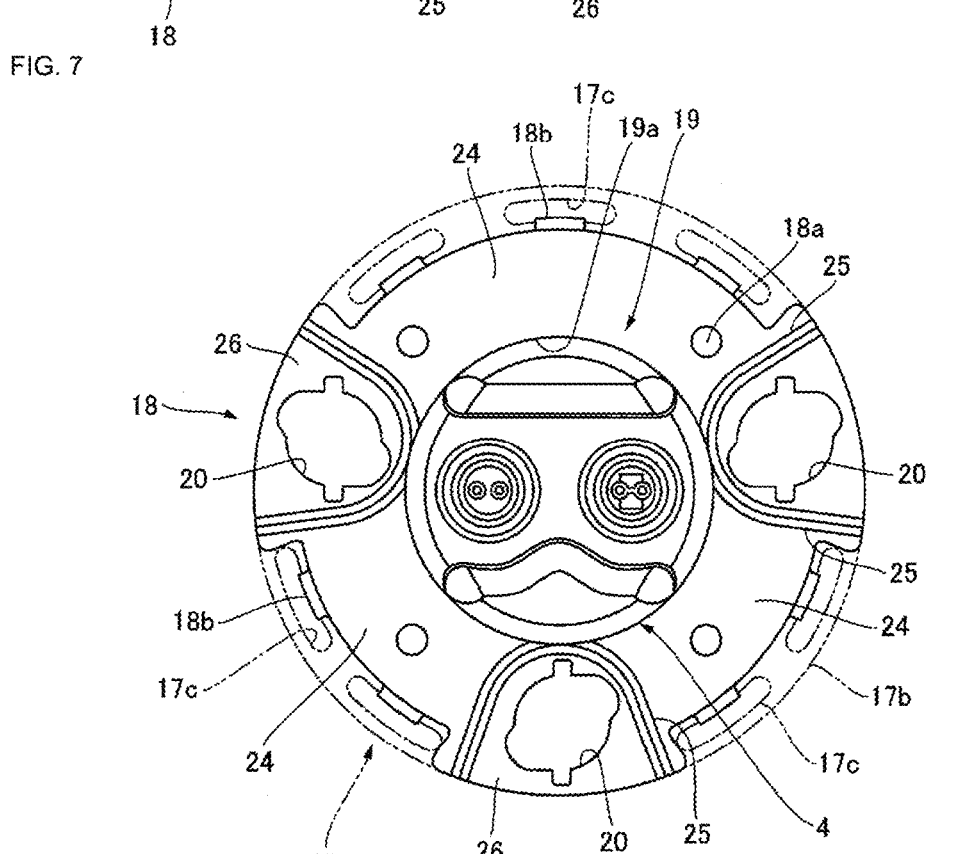
FIG. 6 is a side view of the assembled state depicted in FIG. 5.
FIG. 7 is a rear view depicting a state in which a securing member is provided in the assembled state depicted in FIG. 5.

The mounting member 18 has a circular through-hole part 19 formed at a center position thereof, to which the inflator 4 is attached, and three retaining parts 20 arranged surrounding the circular through-hole 19 (see FIG. 4 and FIG. 7). In the present Embodiment, the retaining part 20 is a through hole.

The securing member 17 and the retainer ring 16 are formed with holes 16b and 17a, respectively, which communicate with the circular through-hole part 19 and serve to position the inflator 4 within the airbag cushion 5.

The bolts 16a of the retainer ring 16 are inserted through the bolt through holes 18a of the securing member 17 and the mounting member 18, and nuts 21 are fastened from the back side of the mounting member 18, thereby assembling the inflator 4 and the airbag cushion 5 to the module base 15.

Furthermore, the cylindrical part 3b of the horn cover 3, in which the airbag cushion 5 is stowed, is attached to the module base 15.

The airbag module 2 is constructed by assembling the airbag cushion 5, the inflator 4, and the horn cover 3 to the module base 15, and functions as a damper mass for damping vibrations.

The damper unit 10 is provided between the airbag module 2 and the steering wheel 1 as a functional component for damping vibrations transmitted between the airbag module 2 and the steering wheel 1.

The airbag module 2 is connected and attached to the steering wheel 1 via the damper unit 10.

As depicted in FIG. 1 and FIG. 3, damper units 10 are arranged in three retaining parts (through holes) 20 of the mounting member 18 that constitutes a module base 15 of the airbag module 2.

As depicted in FIGS. 2 to 4, the damper unit 10 is composed of a hollow cylindrical damping member 14 that is attached to the retaining part 20 of the mounting member 18, and a rod-shaped pin 11 that is slidably inserted into a damping member 14. The pin 11 has a connecting tip part 11a at a first end part and a base plate part 11b at a second end part. The damping member 14 is configured to include rubber 51 that exhibits a vibration damping effect.

Figure 3A:
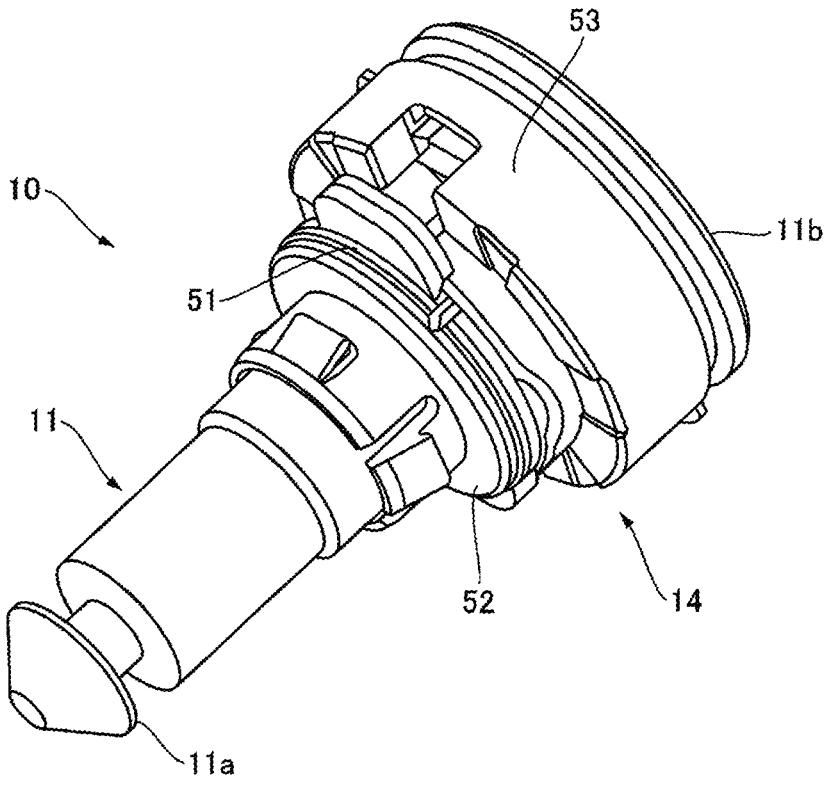
Figure 3B:
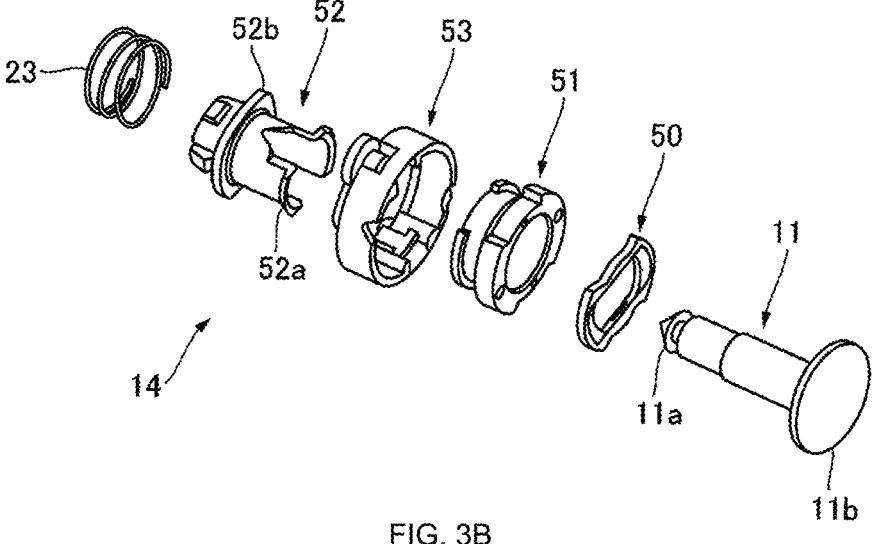

FIG. 3(a) is a perspective view of the damper unit 10, and FIG. 3(b) is an exploded perspective view of the damper unit 10.

To briefly describe the configuration of the damping member 14 that constitutes the damper unit 10, the damping member is composed of an annular insulator 50 that is overlapped on the base plate part 11b of the pin 11, an annular rubber 51 that surrounds the pin 11 and is overlapped on the annular insulator 50 and provides a vibration damping effect, a collar 52 that is formed in a cylindrical shape that surrounds the pin 11 so as to be able to slide freely, with a tab part 52a engaging with the annular insulator 50 to clamp the rubber 51, the rubber 51 positioned on the outside, and a holder 53 that is formed in a cylindrical shape that surrounds the outside of the rubber 51, is provided on the base plate part 11b side of the pin 11, and holds the rubber 51 to the pin 11.

The collar 52 is provided with a spring seat 52b of the horn spring 23, which will be described below.

When assembling the damper unit 10, the rubber 51 is inserted into the holder 53, the annular insulator 50 is overlapped on the rubber 51, and the annular insulator 50 is engaged with the tab part 52a of the collar 52 inserted from the opposite side of the holder 53, thereby completing the damping member 14.

A connecting tip part 11a of the pin 11 is formed in a cone shape. The pin 11 is pressed into the collar 52 from the connecting tip part 11a side, and is fitted into the damping member 14 so as not to be removable.

The pin 11 is connected to the steering wheel 1 by inserting the longitudinal connecting tip part 11a having the narrowed part 11d into the collar member 12 and engaging the narrowed portion 11d with an engaging member 22 provided on the boss part 6.

The pin 11 is connected to the airbag module 2 by engaging the second end part 11b in the longitudinal direction, which has a flange part 11c, with the damping member 14 provided on the retaining part 20 of the mounting member 18.

A horn spring 23 is provided between the boss part 6 of the steering wheel 1 and the mounting member 18 of the module base 15 so as to surround the pin 11 and serve as an elastic member that is elastically deformable. The horn spring 23 elastically supports the airbag module 2 away from the steering wheel 1.

The vibration of the steering wheel 1 is transmitted to the damping member 14 via the pin 11. The damping member 14 dampens the vibrations of the steering wheel 1 transmitted thereto, using the airbag module 2, to which the damping member 14 is attached, as a damper mass.

In addition, when the airbag module 2 is pressed toward the steering wheel 1 to operate the horn, the horn spring 23 is elastically deformed, causing the damping member 14 to slide relative to the pin 11 connected to the steering wheel 1, and the module base 15 is moved toward the steering wheel 1 together with the damping member 14.

Although not shown, horn contacts for sounding the horn are provided on the pin 11 and the module base 15, which come into contact with and are separated from each other.

In the airbag device provided in a steering wheel according to the present Embodiment, the inflator 4 and the damper unit 10, which is a functional component, are assembled to a mounting member 18 having a unique configuration, as shown in detail in FIG. 4 to FIG. 7.

The inflator 4 is formed in a cylindrical shape. The inflator 4 has an annular stopper 4b formed on a first end side having the gas discharge hole 4a, in other words, the end side opposite the boss part 6 which is inserted into the airbag cushion 5, protruding slightly in the radial direction of the inflator 4.

The mounting member 18 is formed from a plate material. The mounting member 18 is provided with a circular through-hole part 19 formed in a central position, three retaining parts 20 protruding radially outward from the circular through-hole part 19 and formed to match the arrangement of the three damper units 10, and a flat part 24 formed connecting these retaining parts 20 and the circular through-hole part 19 to reinforce the retaining parts 20.

The circular through-hole part 19 is composed of a circular hole 19a formed by penetrating the mounting member 18 in the axial direction (length direction) of the cylindrical shaped inflator 4, and an annular rib 19b formed on the inner circumferential edge of the circular hole 19a and raised in the axial direction of the inflator 4.

The inflator 4 is press-fitted into the circular hole 19a of the circular through-hole part 19 from the front side to the back side along the axial direction of the inflator 4, and the annular rib 19b is pressed against the circumferential side surface 4c of the inflator 4.

As a result, the inflator 4 is firmly secured to the circular through-hole part 19 of the mounting member 18 by press-fitting.

The annular stopper 4b of the inflator 4 assembled to the circular through-hole part 19 faces the annular rib 19b in the axial direction of the inflator 4 with a gap therebetween.

When the inflator 4 discharges inflator gas from the gas discharge hole 4a, the annular rib 19b stops the inflator 4 from moving toward the boss part 6 through the circular hole 19a, thereby preventing the inflator 4 from coming out of the mounting member 18.

The mounting member 18 is bent from the front side to the back side to form a solid wall 25 that enhances the strength of the mounting member 18.

This solid wall 25 forms an inner groove part 26 recessed toward the rear surface side, and the retaining part 20 is formed in the inner groove part 26.

The damping member 14 of the damper unit 10 is engaged and held in the retaining part 20 which is a through hole.

The engaging structure is such that both the retaining part 20 in the form of a through hole and the damping member 14 are formed, for example, in an elliptical shape defined by a major axis and a minor axis, the major axes and minor axes of the retaining part 20 and the damping member 14 are aligned with each other, the damping member 14 is inserted into the retaining part 20, and then the damping member 14 is rotated so that the damping member 14 is engaged with the retaining part 20. As a result, the damper unit 10 is assembled to the mounting member 18.

The flat part 24 has an inner groove part 26 including the retaining part 20 connected to the circular through-hole part 19 via the solid wall 25, thereby connecting the retaining part 20, which is cantilevered from the circular through-hole part 19, to the circular reinforcing part 19 for reinforcement.

The circular through-hole part 19, the solid wall 25, the inner groove part 26, and the like of the mounting member 18 can be formed by ordinary press molding of a plate material.

In the present Embodiment, as described with regards to FIG. 2, the plate-shaped securing member 17 is overlapped over the mounting member 18 from the airbag module 2 side, and the nut 21 is fastened to the retainer ring 16, whereby both the securing member 17 and the mounting member 18 are assembled and secured. FIG. 4 and FIG. 7 depict the state in which the securing member 17 is assembled to the mounting member 18.

The securing member 17 is disk-shaped and sized to cover the inner groove part 26 of the mounting member 18, with a hole part 17a formed in the center for passing the inflator 4 through, and an annular vertical wall part 17b formed at the outer edge position, raised toward the front side.

The damper unit 10 has a connecting tip part 11a of a pin 11 having a narrowed portion 11d held on the steering wheel 1, and the second end part 11b of the pin 11 having a flange part 11c on the airbag module 2 side is positioned between the securing member 17 and the mounting member 18 by the securing member 17 covering the inner groove part 26.

The mounting member 18 is formed with an assembly protrusion 18b for alignment with the securing member 17 when assembled, and the securing member 17 is formed with an engaging hole 17c into which the assembly protrusion 18b fits.

Furthermore, an elastically deformable engaging hook 3c formed on the cylindrical part 3b of the horn cover 3 of the airbag module 2 is engaged with the engaging hole 17c of the securing member 17.

By engaging the engaging hook 3c with the engaging hole 17c, the horn cover 3 housing the airbag cushion 5 is attached to the securing member 17, that is, the module base 15 on which the inflator 4 is provided.

The operation of the airbag device provided in a steering wheel according to the present Embodiment will be described.

First, the inflator 4 is attached to the circular through-hole part 19 of the mounting member 18, and the damper unit 10, which is a functional component, is attached to the retaining part 20.

Next, the securing member 17 is overlapped on the mounting member 18 from the front side, and then the airbag cushion 5 with the retainer ring 16 attached is assembled from the front side by passing the bolt 16a of the retainer ring 16 through the bolt through hole 18a of the securing member 17 and the mounting member 18, and secured by tightening the nut 21 onto the bolt 16a.

Next, the horn cover 3 is attached to the securing member 17. In this manner, the airbag module 2 is completed.

To attach the airbag module 2 to the steering wheel 1, the collar member 12 is positioned in the mounting hole 13 of the boss part 6, the horn spring 23 is disposed between the steering wheel 1 and the airbag module 2, the pin 11 of the damper unit 10 is inserted through the horn spring 23 and into the collar member 12, and the narrowed portion 11d of the pin 11 is engaged with the engaging member 22.

This completes the installation of the airbag module 2 onto the steering wheel 1.

In the airbag device provided in a steering wheel of the present Embodiment, the inflator 4 is cylindrical in shape and does not have a flange part, and the mounting member 18 is formed with a circular through-hole part 19 into which the inflator 4 is fitted, and the inflator 4 is secured to the mounting member 18 by being press-fitted therein.

This makes it possible to form the retaining part 20 of the damper unit 10, which is a functional component, so as to be positioned around the inflator 4 in close proximity to the inflator 4, eliminating the need for wasted space caused by the mounting piece in the background technology and allowing the damper unit 10 to be brought closer to the inflator 4.

As a result, the installation space for the inflator 4 and the damper unit 10 can be narrowed and made compact with respect to the steering surface of the steering wheel 1, and the airbag module 2 can be significantly reduced in size relative to the outer diameter of the steering wheel 1.

An airbag device including such a miniaturized airbag module 2 can be appropriately installed even on a non-circular or irregularly shaped steering wheel 1.

The circular through-hole part 19 is formed through the mounting member 18 in the axial direction of the inflator 4, and is composed of a circular hole 19a into which the inflator 4 is fitted, and an annular rib 19b formed on the inner circumferential edge of the circular hole 19a that is pressed against the circumferential side surface 4c of the inflator 4, so that the inflator 4 can be firmly secured to the mounting member 18.

Since the inflator 4 can be firmly secured to the mounting member 18 constituting the module base 15, the inflator gas can be supplied to the airbag cushion 5 with a level comparable to that of the conventional technology.

Since the inflator 4 is provided with the annular stopper 4b facing the annular rib 19b, the inflator 4 can be prevented from coming out of the mounting member 18 when the inflator gas is ejected.

An inner groove part 26 is formed in the mounting member 18 by the solid wall 25 that enhances the strength of the mounting member 18, and a retaining part 20 is formed within the inner groove part 26, thereby enhancing the strength of the entire mounting member 18 to which the inflator 4 and the damper unit 10 are assembled.

The airbag module 2 is provided with a securing member 17 which is placed over the airbag module 2 and secured to the mounting member 18, and the damper unit 10 holds the second end part 11b of the pin 11 between the securing member 17 and the mounting member 18, and holds the connecting tip part 11a on the steering wheel 1. This ensures that the vibration damping effect of the damper unit 10 is adequately achieved.

The airbag module 2 is provided with a horn cover 3 that covers the airbag cushion 5, and the horn cover 3 is attached to the securing member 17 that constitutes the module base 15, so that the airbag module 2 can be constructed with a small number of parts.

The mounting member 18 includes a circular through-hole part 19 formed in a central position, a retaining part 20 formed at a position protruding radially outward from the circular through-hole part 19, a flat part 24 formed connecting between the retaining part 20 and the circular through-hole part 19, and reinforcing the retaining part 20, thereby further increasing the strength of the entire mounting member 18 to which the inflator 4 and the damper unit 10 are assembled.

Figure 8:
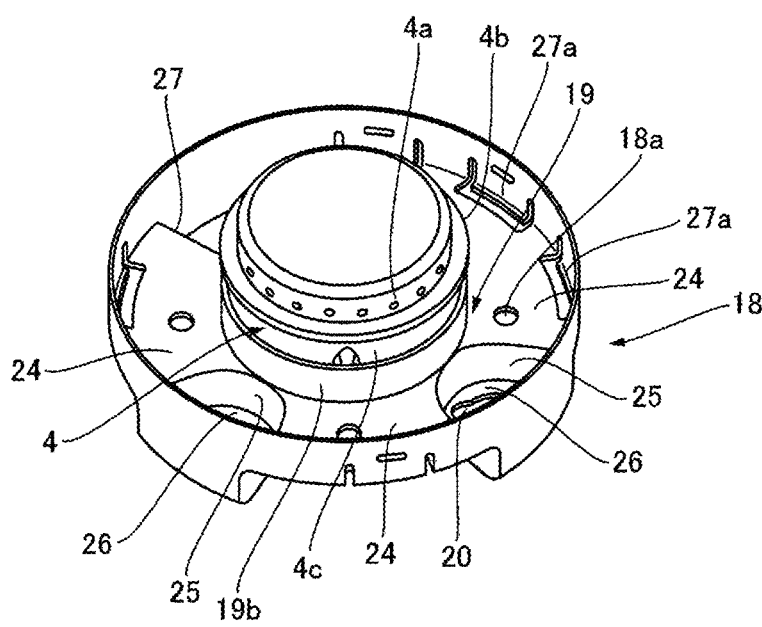
FIG. 8 is a perspective view depicting a Modified Example of a mounting member provided in the airbag device provided in a steering wheel according to the present invention.
Figure 9:
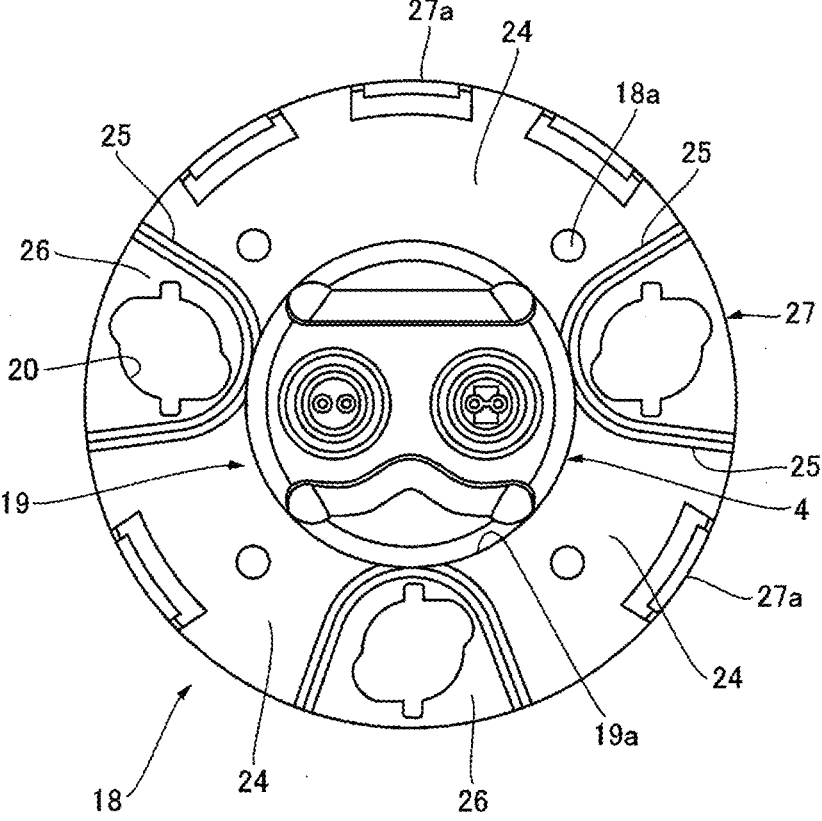
FIG. 9 is a rear view of the assembled state depicted in FIG. 8.
Figure 10:
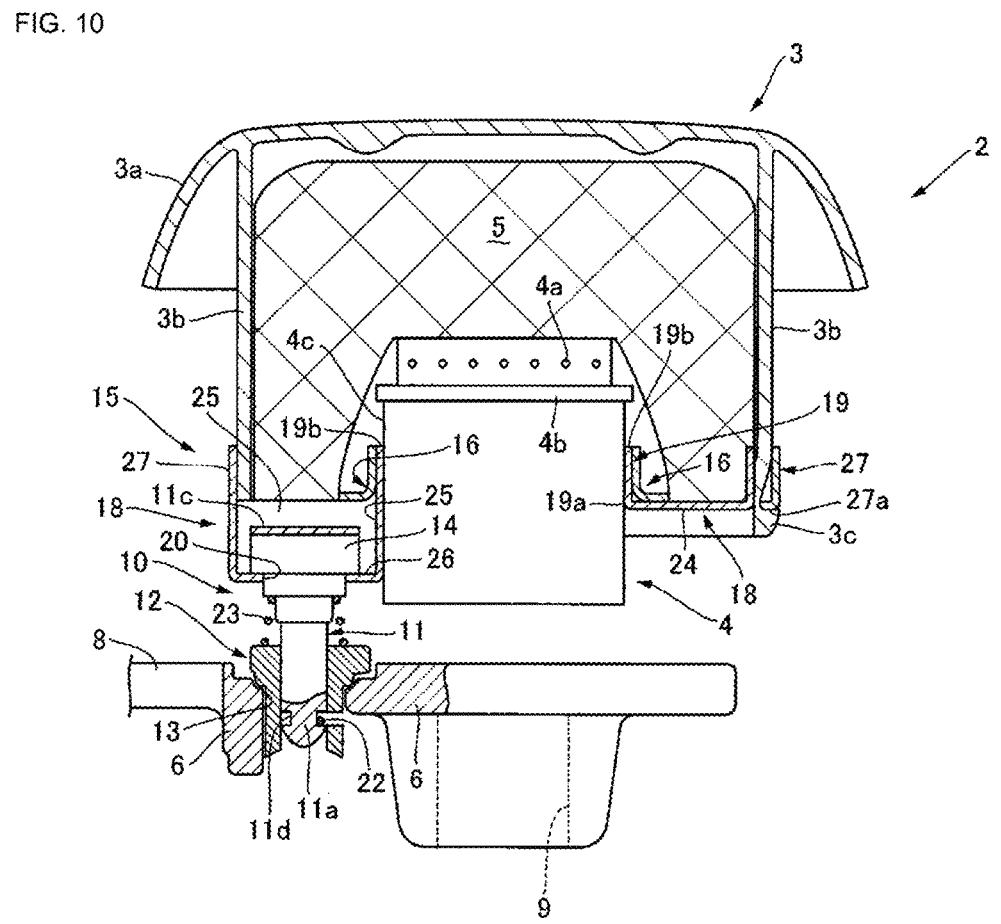
FIG. 10 is a cross-sectional view depicting an assembled state of an airbag device provided in a steering wheel, in accordance with the Modified Example of FIG. 8.

FIGS. 8 to 10 illustrate a Modified Example of the above Embodiment. In the above embodiment, the securing member 17 is overlapped on the mounting member 18, but in this Modified Example, the securing member 17 is omitted, and the ring retainer 16 is directly fastened to the mounting member 18 with the nut 21.

The mounting member 18 of this Modified Example is formed in a disk shape, and in the same manner as the mounting member of the above embodiment, is provided with a circular through-hole part 19, a retaining part 20, and a flat part 24. In addition, at the outer edge position, an annular reinforcing wall part 27 is formed rising toward the front side, connected to the flat part 24 and the retaining part 20 and surrounding the flat part 24 and the retaining part 20.

By providing the annular reinforcing wall part 27 facing the annular rib 19*b* in the radial direction of the mounting member 18, the strength of the mounting member 18 can be further increased.

The annular wall part 27 is formed with a bent piece 27*a* for engaging with an elastically deformable engaging hook 3*c* formed on the cylindrical part 3*b* of the horn cover 3 of the airbag module 2.

By engaging the engaging hook 3*c* with the bent piece 27*a*, the horn cover 3 stowing the airbag cushion 5 is attached to the mounting member 18, that is, the module base 15 to which the inflator 4 is secured.

This Modified Example will of course exhibit the same function effect as the embodiment described above.

In this Modified Example, the securing member 17 is omitted, thereby making it possible to reduce the number of parts and the weight.

In the above embodiment, the damper unit 10 has been described as an example of a functional component, but it goes without saying that the functional component is not limited to the damper unit 10 and may be other functional components that are assembled to the mounting member 18, such as other horn parts.

The airbag device provided in a steering wheel described above is a preferred example of the present invention, and other embodiments can be implemented or performed in various ways. In particular, unless otherwise described in the specification of the application, the invention is not restricted to the shapes, sizes, configurational dispositions, and the like of the parts illustrated in detail in the accompanying drawings. In addition, the expressions and terms used in the specification of the application are used for providing a description, without limiting the invention thereto, unless specifically described otherwise.

Explanation of Codes

1. Steering wheel
2. Airbag module
3. Horn cover
4. Inflator

4*b*. Annular stopper
4*c* Circumferential side surface of inflator
5. Airbag cushion
10. Damper unit
17. Securing member
18. Mounting member
19. Circular through-hole part
19*a*. Circular hole
19*b*. Annular rib
20. Retaining part
23. Horn spring
24. Flat part
25. Solid wall
26. Inner groove part
27. Reinforcing wall part

The invention claimed is:

1. An airbag device provided in a steering wheel, comprising:
an airbag module containing an airbag cushion and a cylindrical shaped inflator that supplies inflator gas to the airbag cushion;
a functional component provided between the airbag module and the steering wheel; and
a monolithic mounting member formed of a pressed plate material to which the inflator and the functional component are assembled, wherein the mounting member has formed thereon:
a retaining part for retaining the functional component;
a circular through-hole part into which the inflator is press-fit to secure the inflator, the circular through-hole part including:
a circular hole formed in the mounting member penetrating in an axial direction perpendicular to a center of a bottom surface of the inflator and into which the inflator is pressed; and
an annular rib formed on an inner circumferential edge of the circular hole and pressed onto a circumferential side surface of the inflator, wherein the annular rib is directly connected to the retaining part via a solid wall; and
a flat part on an outer circumference of the circular through-hole part, wherein the retaining part is provided so as to have a step with regard to the flat part, and wherein the step is characterized by the solid wall extending from the flat part and forming an inner groove part, the retaining part being formed on this inner groove part.

2. The airbag device provided in a steering wheel according to claim 1, wherein an annular stopper is provided on the circumferential side surface of the inflator between the annular rib and a gas discharge hole of the inflator.

3. The airbag device provided in a steering wheel according to claim 1, wherein the functional component is a damper unit that dampens vibration transmitted between the airbag module and the steering wheel, is provided between the mounting member and the steering wheel, and includes an elastic member that elastically holds the airbag module on the steering wheel.

4. The airbag device provided in a steering wheel according to claim 1, wherein the airbag module is provided with a securing member attached and secured to the mounting member, and wherein a first end of the functional component is held between the securing member and the mounting member, and a second end is held on the steering wheel.

5. The airbag device provided in a steering wheel according to claim 4, wherein the airbag module is provided with a cover for covering the airbag cushion and this cover is attached to the securing member.

6. The airbag device provided in a steering wheel according to claim 1, wherein the mounting member is provided with an annular reinforcing wall part surrounding a flat part of the mounting member and the retaining part.

7. The airbag device provided in a steering wheel according to claim 6, wherein the airbag module is provided with a cover for covering the airbag cushion and this cover is attached to the reinforcing wall part.

8. An airbag device provided in a steering wheel, comprising:

an airbag module containing an airbag cushion and a cylindrical shaped inflator that supplies inflator gas to the airbag cushion;

a functional component provided between the airbag module and the steering wheel; and a monolithic mounting member formed of a pressed plate material to which the inflator and the functional component are assembled, wherein the mounting member has formed thereon:

a retaining part for retaining the functional component; and a circular through-hole part into which the inflator is press-fit to secure the inflator, the circular through-hole part including:

a circular hole formed in the mounting member penetrating in an axial direction perpendicular to a center of a bottom surface of the inflator and into which the inflator is pressed; and an annular rib formed on an inner circumferential edge of the circular hole and pressed onto a circumferential side surface of the inflator, wherein the annular rib is directly connected to the retaining part via a solid wall, the solid wall being parallel to the annular rib and perpendicular to the retaining part.

9. The airbag device provided in a steering wheel of claim 8, wherein peripheral portions of the solid wall extend out from the annular rib in two directions to form an inner groove part, the retaining part being formed on the inner groove part.

10. The airbag device provided in a steering wheel of claim 9, wherein the peripheral portions of the solid wall extend out from the annular rib in the two directions to a periphery of the mounting member.

11. An airbag device provided in a steering wheel, comprising:

an airbag module containing an airbag cushion and a cylindrical shaped inflator that supplies inflator gas to the airbag cushion;

a functional component provided between the airbag module and the steering wheel; and a monolithic mounting member formed of a pressed plate material to which the inflator and the functional component are assembled, wherein the mounting member has formed thereon:

a retaining part for retaining the functional component;

a flat part parallel to the retaining part; and a circular through-hole part into which the inflator is press-fit to secure the inflator, the circular through-hole part including:

a circular hole formed in the mounting member penetrating in an axial direction perpendicular to the flat part and into which the inflator is pressed; and an annular rib formed on an inner circumferential edge of the circular hole and pressed onto a circumferential side surface of the inflator, wherein the annular rib is directly connected to the retaining part via a solid wall extending from the flat part to the retaining part.

12. The airbag device provided in a steering wheel of claim 11, wherein the solid wall extends out from the annular rib in two directions to form an inner groove part, the retaining part being formed on the inner groove part.

13. The airbag device provided in a steering wheel of claim 12, wherein the solid wall extends out from the annular rib in the two directions to a periphery of the mounting member.

* * * * *